(12) United States Patent
Caruso

(10) Patent No.: US 7,325,013 B2
(45) Date of Patent: Jan. 29, 2008

(54) DATABASE WITH EFFICIENT FUZZY MATCHING

(75) Inventor: Jeffrey L Caruso, Carlisle, MA (US)

(73) Assignee: ID3MAN, Inc., Los Angeles, CA (US)

( * ) Notice: Subject to any disclaimer, the term of this patent is extended or adjusted under 35 U.S.C. 154(b) by 400 days.

(21) Appl. No.: 10/830,962

(22) Filed: Apr. 22, 2004

(65) Prior Publication Data

US 2005/0234901 A1    Oct. 20, 2005

Related U.S. Application Data

(60) Provisional application No. 60/563,076, filed on Apr. 15, 2004.

(51) Int. Cl.
*G06F 17/30* (2006.01)
*G06F 7/00* (2006.01)

(52) U.S. Cl. .................. 707/104.1; 707/102; 707/6

(58) Field of Classification Search ................ 707/3, 707/10, 102
See application file for complete search history.

(56) References Cited

U.S. PATENT DOCUMENTS

| | | | |
|---|---|---|---|
| 5,546,578 A | | 8/1996 | Takada |
| 5,550,976 A | | 8/1996 | Henderson et al. |
| 5,706,365 A | | 1/1998 | Rangarajan et al. |
| 5,918,223 A | * | 6/1999 | Blum et al. .................... 707/1 |
| 6,437,227 B1 | * | 8/2002 | Theimer ...................... 84/609 |
| 6,678,680 B1 | * | 1/2004 | Woo .............................. 707/6 |
| 7,043,494 B1 | * | 5/2006 | Joshi et al. ................. 707/101 |
| 2002/0099691 A1 | * | 7/2002 | Lore et al. ..................... 707/2 |
| 2003/0023421 A1 | * | 1/2003 | Finn et al. ..................... 704/1 |
| 2004/0078364 A1 | * | 4/2004 | Ripley et al. .................. 707/3 |

OTHER PUBLICATIONS

Notification of International Search Report and Written Opinion, PCT/US05/12285, 10 pages.

Gionis, A., et al., "Similarity Search in High Dimensions via Hashing," Proceedings of the 25th International Conference on Very Large Data Bases, 1999, pp. 518-529, Edinburgh, Scotland.

Kushilevitz, E, et al., "Efficient Search for Approximate Nearest Neighbors in High Dimensional Spaces," Proceedings of the Thirtieth Annual ACM Symposium on the Theory of Computing, 1998, 18 pages.

* cited by examiner

*Primary Examiner*—Kuen S. Lu
(74) *Attorney, Agent, or Firm*—Fenwick & West LLP

(57) ABSTRACT

A database includes a repository of data segments to be searched, called standard streams. But rather than searching all possible segments of each standard stream, the database includes a set of index files that reference a number of different segments in the repository. Each index file provides information about whether various data segments in the repository are likely to match a given test stream, although in the presence of noise there may be multiple possible matches. By consulting a number of the index files, a searching algorithm identifies a set of candidate data segments to test and thus reduces the number of streams that must be tested.

28 Claims, 4 Drawing Sheets

DATABASE WITH EFFICIENT FUZZY MATCHING

CROSS REFERENCE TO RELATED APPLICATIONS

This application claims the benefit of U.S. Provisional Application No. 60/563,076, filed Apr. 15, 2004, which is incorporated by reference in its entirety.

BACKGROUND

1. Field of the Invention

This invention relates generally to matching test data to data within a database, and in particular to efficient fuzzy matching of data sampled from a noisy environment to samples within a large repository.

2. Background of the Invention

An important class of problems involves searching through a data repository for a match to particular item of test data, where the data repository contains a large number of data segments. The repository typically contains a set of sequenced data that reflects known events or items, and the test segment is a sample acquired from an unknown event or item. The test segment is often, but not necessarily, a subset (or sample in size) than individual stored data items. In this problem, the identity of the test segment is determined by matching the test segment to one or more data segments (or portions thereof) in the repository. Because of measurement noise and other real-world problems, the acquired test segment is not expected to match exactly with a segment in the repository. Accordingly, an approximate match may be considered sufficient to have a reasonable confidence in the match.

There are various specific applications of this problem. For example, the repository might include streams of feature vectors from audio samples in a database of songs, streams of feature vectors from video samples in a database of movies, or even portions of gene sequences in a database of DNA sequences. An obvious brute-force method to match a test segment to a segment in such a database is to keep a repository of all the streams and then attempt to match the test segment to each stream in the repository. This problem is made more difficult where the streams in the repository are longer than the test segment. In such a case, brute-force matching requires testing for each stream every substream of the same length as the test stream. Although such a brute-force method would likely give a correct answer, it can also be quite inefficient. In many applications, the repository could contain millions of streams, making searching each of the possible samples in the database to find a match impractical for real world applications.

Nearest-neighbor matching and approximate nearest-neighbor matching have been intensively studied for a number of years. But applying those solutions to this problem quickly becomes unmanageable for high dimensions, corresponding to a wide feature vector, as described in "Approximate Closest-Point Queries in High Dimensions," by M. Bern, Information Processing Letters (1993). One approach for solving the approximate nearest-neighbor search problem is called "locality-sensitive hashing," described in "Similarity Search in High Dimensions via Hashing," by Gionis, Indyk et al. (1998). This solution, however, does not function well in the presence of noise levels of 20% or more. Searching time-sequenced data has also been studied, for example, in "Efficient Similarity Search in Sequence Databases," by Agrawal, Faloutsos, and Swami, but the combination of multi-dimensional feature vectors plus time-sequencing is a difficult problem.

Accordingly, it is desirable to construct an appropriate data repository and provide a method for efficiently searching it, where the data repository and the test segment comprise high-dimensional data that may be affected by noise. Such a search may involve determining whether a test stream matches a stream already in the repository and finding that stream, or it may involve finding all streams in the repository that are sufficiently close to the given test stream to constitute a match. Preferably, the method should be sufficiently robust to function reliably in the presence of noise.

SUMMARY OF THE INVENTION

In one embodiment, a database includes a repository of data segments to be searched, called standard streams. Rather than searching all possible segments of each standard stream, the database includes a set of index files that reference a number of different segments in the repository. Each index file provides information about whether various data segments in the repository are likely to match a given test stream, although in the presence of noise there may be multiple possible matches. By consulting a number of the index files, a searching algorithm identifies a set of candidate data segments to test and thus reduces the number of streams that must be tested, thus saving computing resources that would otherwise be devoted to testing each stream for a match.

In one embodiment, a method and computer program product are provided for identifying a test stream by matching the test stream to a substream within a repository of standard streams. In this sense, a substream includes at least a portion of a standard stream in the repository. To identify the test stream, a plurality of substreams are indexed according to a plurality of templates. Each template specifies a number of bit positions and is associated with a plurality of buckets such that each bucket references a group of substreams that have the same values at the bit positions specified by the template. In this way, this indexing gives information about groups of substreams in an efficient way without requiring a detailed search of substreams in the repository. The buckets that contain substreams whose bit values match the test stream at the bit positions specified in the corresponding template are marked. Accordingly, each marked bucket indicates an increased probability that the substreams referenced by the bucket are a match, since the substreams have the same bits values as the test stream at the bit positions specified by the template. Based on their occurrence in the marked buckets, therefore, a number of substreams are identified in a candidate set of substreams. The substreams in this candidate set are tested for a match with the test stream within the error tolerance, saving the resources that would otherwise be required to test all possible substreams in the repository.

In another embodiment, a database for identifying a test stream includes a repository of standard streams and a plurality of indexes that identify substreams of the standard streams in the repository. Each index in the database includes a template that specifies a plurality of bit positions within a substream; a set of buckets that reference a group of substreams having the same bit values at the bit positions specified by the template, where the values at the bit positions defined by the template define an index value; and a set of keys that are each associated with a bucket and identify the index value of the substreams referenced by the bucket.

It can be appreciated that there are no false positives within the given error tolerance, as the final test preferably returns only those streams from the repository that actually matching the test stream within the error tolerance. Beneficially, using multiple indexes may reduce the number of false negatives, even in the presence of noise up to a 30% bit-error rate. For many practical applications, a matching algorithm need not give a perfect answer in all cases, but only in most of the cases. The error tolerance, number of indexes used, and other variables can be adjusted according to the needs of a particular application.

DETAILED DESCRIPTION OF THE PREFERRED EMBODIMENTS

Figure 1:
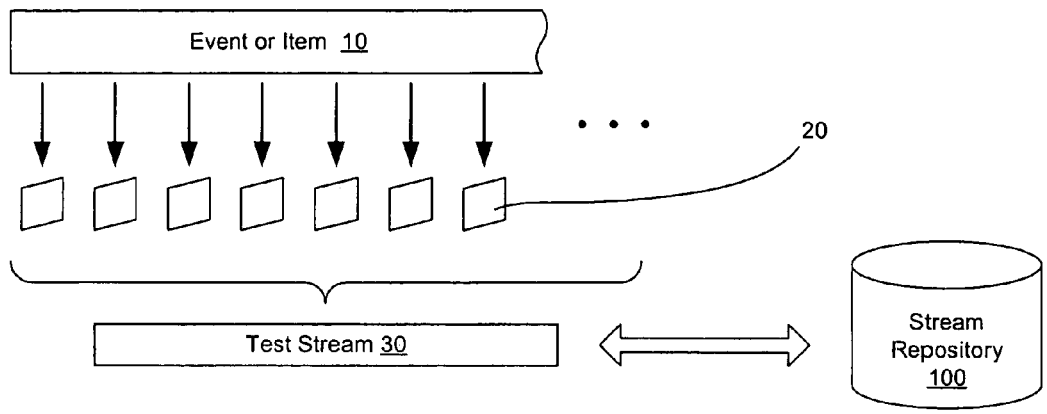
FIG. 1 illustrates obtaining a test stream an event or item and comparing the test stream to a repository to find a match therein, in accordance with an embodiment of the invention.

A database and method of matching to items in the database allow for efficient fuzzy matching of test data while avoiding the impracticalities of searching prohibitively large data repositories. FIG. 1 illustrates one example of an application for which the fuzzy matching algorithm can be used. An event or item 10 is sampled at various locations in a sequence to yield a number of frames 20 of data representative of the event or item 10 at a number of instances of the event or item. Preferably, the sampling rate is constant and is consistent across all the data in the repository and the data to be tested. The event or item 10 may be any number of things from which representative data can be obtained. For example, the event 10 may be an audio or video signal, a data signal representing a measurement over time, or any number of time-sequenced events. It may be obtained from a transmission broadcast, decoded from a digital file, or obtained in any other known way. Alternatively, an item 10 may be sampled, for example a DNA sequence may be sampled, or a color value may be sampled in a dimension along a surface. It can be appreciated that these examples are provided for illustration purposes and are not meant to be limiting of the database and searching method described herein.

As described, the sampling yields a sequence of frames 20, preferably representing the sampled event or item 10 at a number of consecutive equally spaced-apart instances. In one embodiment, a frame 20 is a fixed-size binary bit string that is the basic building-block for data in the database. The fixed size of a frame 20 in bits is called the frame width. The frame width can be selected for different applications, depending for example on the method of sampling the event or item 10, and in one example the frame width is 32 bits. Because each frame 20 is associated with an instance of the event or item 10, the frame 20 may represent the value of a feature set associated with an audio or other digital or analog signal at a single moment in time. For example, if the frames 20 represent an audio signal, each frame may represent characteristic information about the audio signal such as that described in U.S. Provisional Application No. 60/473,502, filed May 27, 2003, incorporated by reference in its entirety herein.

The sampled frames 20 are then assembled into a test stream 30. Streams, including the test stream 30 and those in the repository, comprise a sequence of frames 20. The number of frames 20 in a given stream is the stream length, which is not necessarily fixed. The test stream 30 is a sequence of frames 20 that may be short relative to the typical size of the streams in the repository 100. Preferably, the length of the test stream 30 is fixed, called the test length. The searching algorithm can be greatly simplified if such a constant length is chosen for the searching algorithm, for example, setting the test length to be 100 frames.

Once the test stream 30 is acquired, it is desired to locate a standard stream in the stream repository 100 that matches the test stream 30. In this way, for example, an unknown test stream 30 can be identified by comparison to a known standard stream in the repository 100. The test stream 30 may be shorter that the standard streams in the repository 100 (which themselves need not be equal in length), in which case matching the test stream 30 in the repository 100 involves comparing the test stream 30 to portions of the standard streams, called substreams, having equal length with the test stream 30. A substream of a stream is a contiguous subsequence of the sequence of frames in that stream, starting at a particular frame offset from the start of the stream and ending at a later frame within the stream.

But simple matching of the test stream 30 is insufficient, as there may be some amount of noise introduced into the system, for example from sampling the test stream 30 or even from creating the repository. Accordingly, an error tolerance is introduced to allow streams to match even though their bits are not entirely the same. Given a particular error tolerance, therefore, it is desired to locate one or more standard streams in the repository 100 that match the test stream 30 within the chosen error tolerance.

Figure 2:
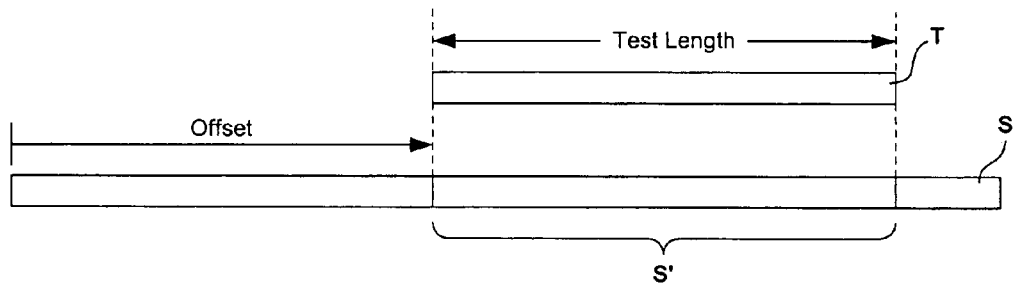
FIG. 2 illustrates a comparison of a test stream and a substream of a standard stream to determine the distance therebetween, in accordance with an embodiment of the invention.

FIG. 2 illustrates a fuzzy matching technique in accordance with an embodiment of the invention. In this embodiment, a test stream T is said to "match" a standard stream S within an error tolerance E if there is some substream S' of standard stream S for which the "distance" between the substream S' and the test stream T is less than or equal to the error tolerance E. As used herein, the term distance may include any appropriate metric for comparing two streams. Two streams of the same length are equal if each frame in one stream is equal to the corresponding frame in the other. But where two streams are not equal, various metrics can be chosen for computing the distance between streams.

In one embodiment, the distance between two streams is the average of the distances between their corresponding frames. The distance between two frames may then be computed as the fraction of the corresponding bits that are different between the two frames, computed for example by dividing the number of corresponding bits in two frames that do not match by the frame width. It can be appreciated that this definition of distance is useful where each bit of the frames has equal importance or weight. Such a definition may not be useful where bits in the frame have a different weight, for example, if the first eight bits in each frame represent a particular characteristic of the data. In that case, a difference between two frames in the first bit would be more significant than a difference in the eighth bit. In this example, therefore, it may make more sense to compute the distance between two frames using the difference of the eight-bit number encoded instead of applying a bitwise comparison of the first eight bits. Alternatively, many other metrics could be used to compute the distance between streams.

The error tolerance E can be selected depending on the application, the expected noise, the tolerance for false matches, and the method of computing the distance. In the embodiment in which the distance is computed according to the fraction of non-matching bits between frames, it can be appreciated that completely unrelated streams are expected to have a distance of 0.50 (i.e., half the bits are expected to match, merely due to the probability). Accordingly, the error tolerance E is selected as a number between 0.50 and 0. In one embodiment, reliable results can be achieved by selecting the error tolerance E to be between 0.05 and 0.30. Accordingly, the fuzzy matching technique described herein can accommodate a significant amount of noise in the data to be matched.

Figure 3:
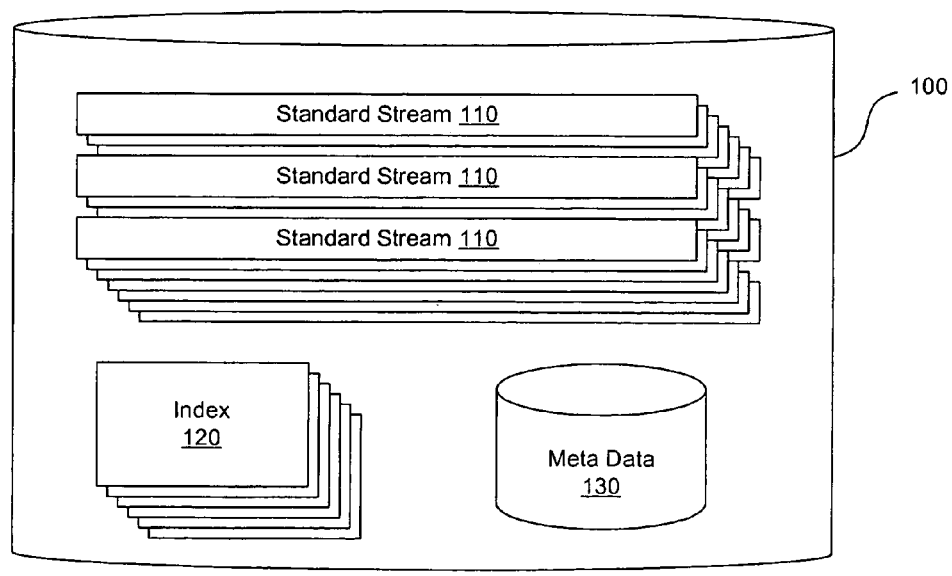
FIG. 3 is a diagram of a repository, in accordance with an embodiment of the invention.

FIG. 3 illustrates a repository 100 in accordance with an embodiment of the invention. The repository 100 includes a set of standard streams 110, each of which includes a sequence of frames and represents a known event or item to which the test stream 30 can be matched. In one embodiment, the standard streams 110 are generally much longer than the 100-frame test length, for example about 6000 and 18000 frames in length. It should be appreciated that the standard streams 110 or any other data in the repository 100 need not be located in the same physical structure, and may be stored on several computer-readable media and even accessible over a communications network.

Because the standard streams 120 typically contain characteristic information about a real-world event or item, the repository 100 may further include a meta data database 130 to provide information about the standard streams 110. For example, where the standard streams include characteristic information for songs, the meta data database 130 may associate each of the standard streams 110 with information about its associated song. Such information includes an identifier for associating with the standard stream 110, the song title, the artist, the music label, and the copyright date. For other applications, the meta data database 130 can be used to provide other information about the standard streams 110 as desired.

The repository 100 also includes a number of indexes 120, each containing information about the standard streams 110 in the repository 100. In this way, the indexes 120 can be consulted for likely matches without having to search blindingly through the repository 100. The number of indexes 120 need not be not fixed, but there should be sufficient indexes 120 as determined by the error tolerance desired, the average expected error in the test stream, and the allowable percentage of false negatives. Generally, increasing the number of indexes 120 in the repository 100 results in a smaller number of false negatives from the matching algorithm.

In one embodiment, a complex relationship exists between the various parameters of the algorithm for finding all substreams in the repository whose distance from the test stream is less than or equal to E. If R is the number of streams in the repository (e.g., 1,000,000), S is the average length of a stream in the repository (e.g., 5000), E is the bit-error rate (e.g., 0.15), N is the number of indexes (e.g., 40), and B is the test width in bits (e.g., 18), then the average bucket utilization (given by $R*S/(2^B)$ is approximately 19,073. Buckets should hold at least this many substream references, but although the algorithm can tolerate some overflowing buckets, preferably the buckets have a larger capacity than the minimum. The probability of finding a test segment in a given index (given by $P=(1-E)^B$) is then 0.0536, and the probability of finding a test segment in at least two indexes is given by $P'=1-(1-P)^N-N*P*(1-P)^{(N-1)}$. This probability decreases with the bit-error rate E but increases with the number of indexes N. In our example, this is 0.64. In the general solution described below, this would mean that on average 1.5625 attempts are expected to match a stream that is near to one in the repository, at an amortized cost of 62.5 bucket reads. The probability of a random segment having the same index value as the test segment is $Q=0.5^B$, and the probability of this happening two or more times is $Q'=1-(1-Q)^N-N*Q*(1-Q)^{(N-1)}$. In this example, $Q=3.8*10^6$ and $Q'=1.135*10^{-8}$, so that the repository would on average have 56.74 substreams that are indexed by the same index value as a given test segment in two or more indexes. These "false leads" would need to be eliminated by individually comparing them, thus adding 89.65 substream comparisons to the amortized cost of the search. This number becomes smaller if a larger test width B is used, at the cost of lowering the probability of matching the test stream on the first try. Accordingly, it can be appreciated that embodiments of the invention described herein have several parameters that can be selected and adjusted as needed for any of a number of intended applications.

Figure 4:
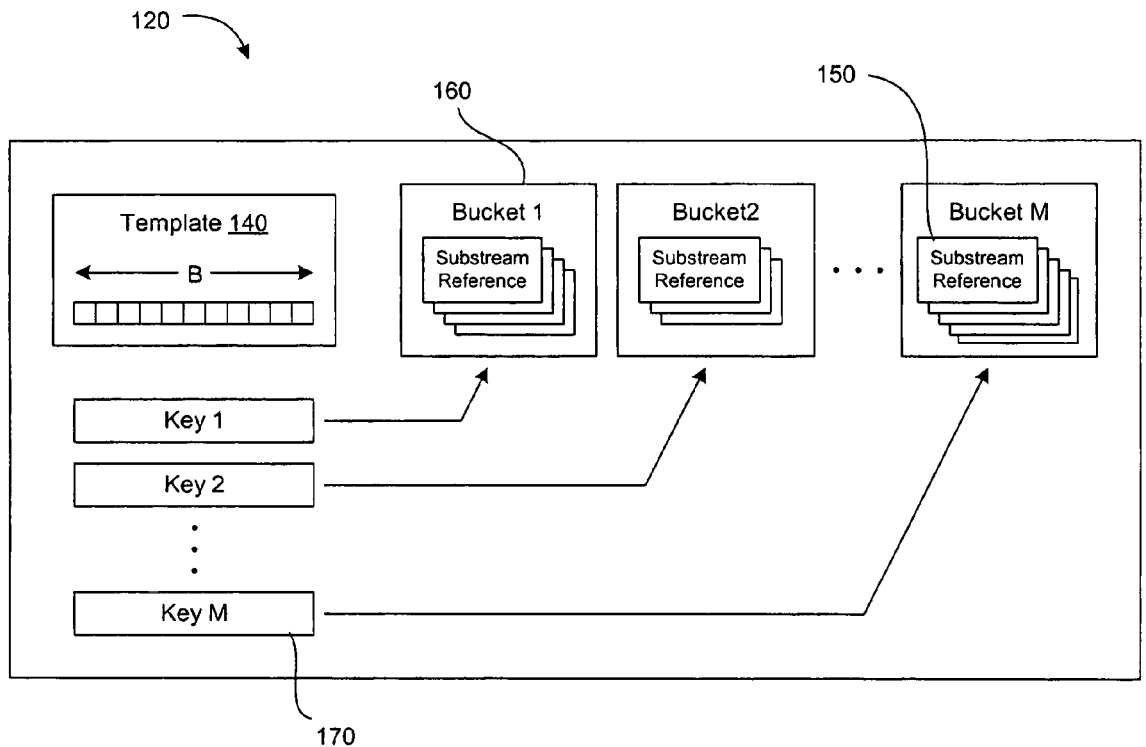
FIG. 4 is a diagram of an index, in accordance with an embodiment of the invention.

FIG. 4 shows one embodiment of an index 120, which includes a template 140, and a set of binary keys 170, and a set of buckets 160 indexed by the keys. Each index 120 is associated with a test width, B, which may vary among the indexes 120. The template 140 for a given index 120 specifies a sequence of B bit positions within any test stream. A bit position within a test stream may be specified according to a frame number of a test stream and a bit number within that frame. It can be appreciated that the specified frame number should not exceed the test length, and the bit number should not exceed the frame width. In a typical embodiment, the template 140 specifies a relatively small number of the bit positions within a test stream. For a test stream having 100 32-bit frames, for example, the template 140 may specify as few as 18 of the 3200 possible bit positions within the test stream. The bit positions may be listed in a standard order, with later frames coming later in the sequence and higher bit positions within the same frame coming later in the sequence. Preferably, the sequence contains one bit position from the first frame. Each index includes a different template 140, the more different the better. In one embodiment, the bit positions for the template 140 for each index 120 are chosen at random, subject to the condition that the first bit position must come from the first frame.

Figure 5:
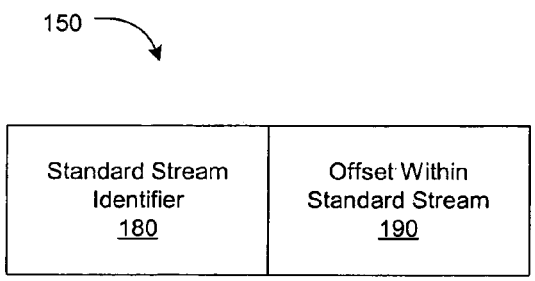
FIG. 5 is a diagram of a substream reference from a bucket in the index shown in FIG. 3, in accordance with an embodiment of the invention.

Each bucket 160 in the index 120 contains a set of at most N substream references 150, where N is the maximum bucket size. As shown in FIG. 5, a substream reference 150 includes an identifier 180 for a particular standard stream 110 in the repository and an offset value 190 within the identified standard stream 110. In this way, each substream reference 150 points to a portion of a standard stream 110 in the repository 100 to which the test stream can be compared. By including a number of substream references 150, each bucket 160 can reference up to the bucket size N number of substreams. In one example, the bucket size could vary between 61 and 8189, allowing it to adapt to the size of the repository 100 and the granularity of data access methods (e.g., the size of a sector on a disk).

As FIG. 4 shows, each key value 170 is associated with a bucket 160. To explain how the key values 170 contain information about their corresponding buckets 160, an index value is defined. For a given test stream (or for any substream having the same length, the test length), an index value is defined as the B-bit bit string for which the value of bit i is equal to the value of the bit in the test stream at bit position i of the index's sample template 140. Each bucket 160 is constructed (i.e., populated with substream references 150) so that for each substream specified in a substream reference 150 in the bucket 160, the index value of the referenced substream is equal to the key value 170 associated with that bucket 160. In this way, the B bits of each substream referenced by a bucket 160 are known from the bucket's key value 170 and the index's template 140. Preferably, each bucket 160 references a maximal number of substreams of the standard streams 110 for which the index value equals the key value. That is, the bucket 160 either references all substreams of the standard streams 110 with the given index value, or the bucket 160 contains the maximum N number of substream references 150 (i.e., is "overflowed").

Figure 6:
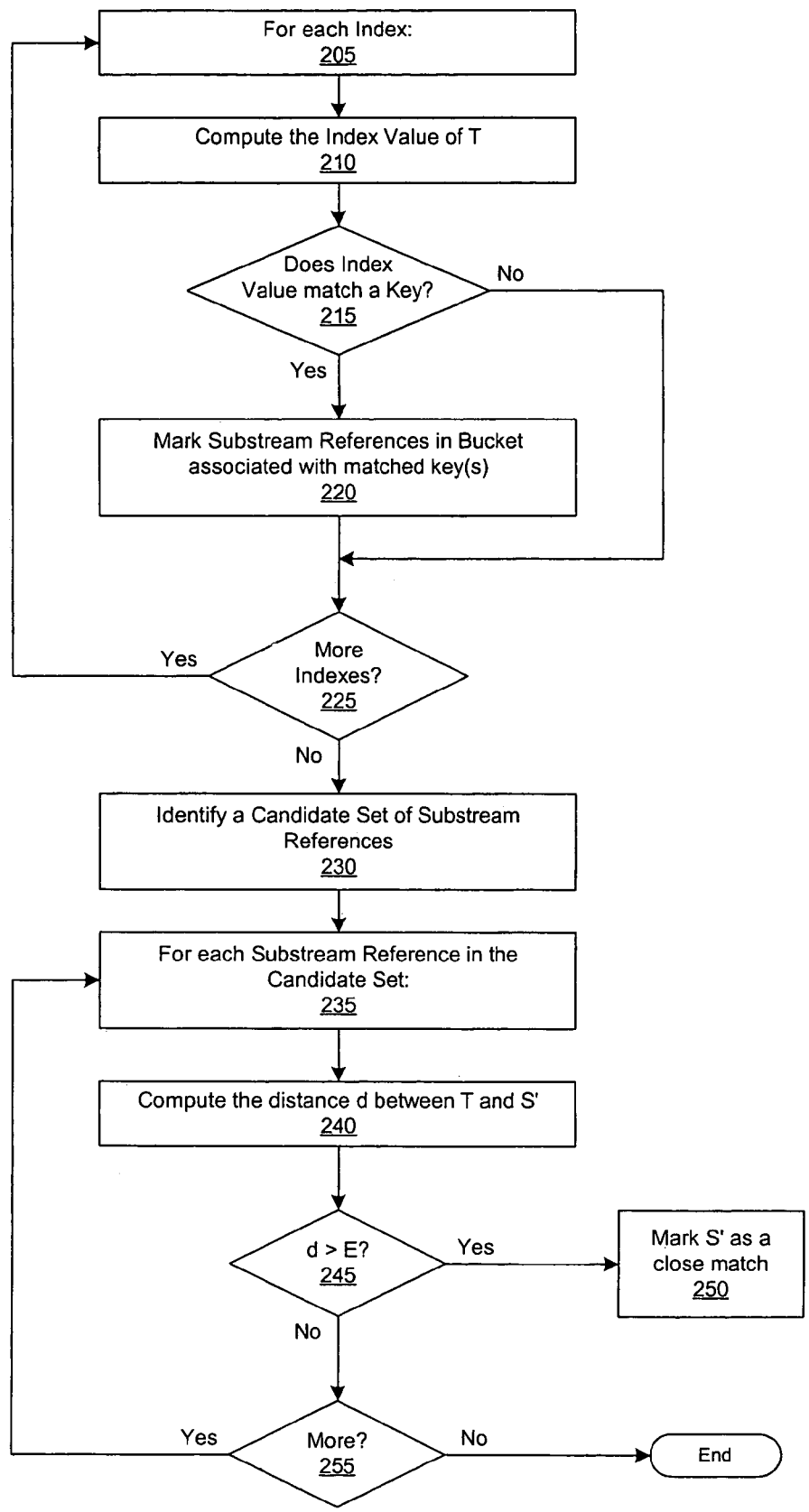
FIG. 6 is a flow diagram of a method for matching a test stream to one or more streams in a repository, in accordance with an embodiment of the invention.

The structure of the repository having been described, a method for matching a test stream to the repository within an error tolerance is presented. FIG. 6 illustrates a method for matching a test stream to one or more streams in a repository, in accordance with an embodiment of the invention. Rather than searching through each standard stream, the method involves searching the indexes to determine a set of candidates that are likely to contain matches for the test stream.

In a first phase of the algorithm, for each index 205 an index value is computed 210 for the index and test stream as described above. The index value is compared with the keys in the index to determine whether the index value matches a key. In one embodiment, the index value must have the exact same B bits as a key value to be considered a match. If the index value does match 215 a key, the bucket associated with that key is located and the substream references contained within the bucket are marked 220. In one embodiment, multiple occurrences of the substream references are efficiently tracked using a sequence of hash tables. Otherwise, a negative result is returned for the particular index. This process is then repeated if there are additional indexes to search (225).

Once the indexes have been searched in this way, a number substream references may have been marked one or more times during this iterative process. Thereafter, a candidate set of substream references is identified 230. The candidate sets includes those substream references that occurred in the greatest number of buckets, i.e., that were marked the most. Depending on the particular application, various criteria can be used to define the candidate set. For example, the candidate set may be taken as a predetermined fraction of the substream references that occurred the most often. Alternatively, the candidate set may include any number of substream references that occurred greater than a predetermined threshold number of times.

For each substream in the candidate set 235, the distance between the test stream and the referenced substream is computed 240, as described above. If the distance is within the given error tolerance 245, the substream is considered a match, and it is marked 250 as such. This process then repeats if there are more substream references in the candidate set (255). Accordingly, the algorithm returns a list substream references that reference substreams that match the test substream within the error tolerance, if any. Beneficially, this list is obtained without having to traverse each of the possible substreams of each of the standard streams in the repository.

Figure 7:
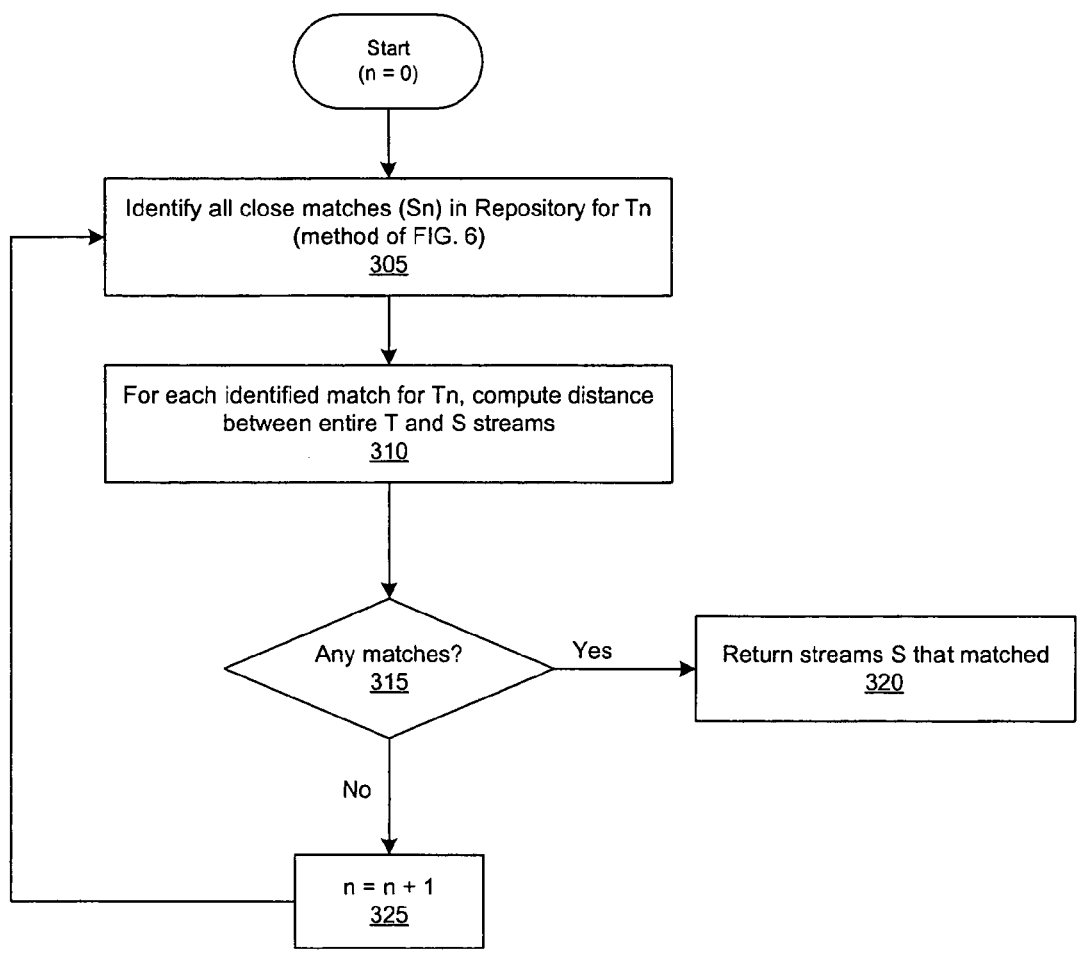
FIG. 7 is a flow diagram of a method for matching a test stream to one or more streams in a repository, in accordance with another embodiment of the invention.

FIG. 7 illustrates another embodiment of a method for matching a test stream to one or more streams in a repository. The embodiment shown in FIG. 7 differs from that in FIG. 6 in that the test stream T is longer than the fixed test length. Accordingly, the test stream T is broken into a number of overlapping segments, each of which is tested as described above. Specifically, T0 denotes the substream of T that begins at the first frame in T and has a length equal to the test length. Similarly, T1 denotes the substream of T beginning at the second frame of T and having a length equal to the test length, and so on. The matching algorithm shown in FIG. 7 is thus a general solution of the restricted problem solved in the algorithm shown in FIG. 6.

The general solution starts by taking the first substream Tn in the test stream T that has a length equal to the test length. Each substream in the test stream T having the test length is denoted Tn, where n is initially 0. With T0 as the stream to be tested, the algorithm described in FIG. 6 is used to identify 305 all close matches in the repository for T0. However, because the entire test stream T is known, step 305 is confirmed using the remaining portion of the test stream T. Accordingly, for each substream identified in step 305 as a close match, the distance between the entire test stream T and the corresponding substream S is computed 310. If after this computing 310 any distanced are still within the error tolerance 315, the algorithm returns 320 these substreams as identified matches. Otherwise, the offset n is incremented 325, and the process repeats for the next substream of the test stream, T1, and so on.

If the last possible substream within the test stream T is checked and no close match is found in the repository, a negative result is returned. In an alternative embodiment, because it is unlikely that a positive result will be returned after the first few unsuccessful iterations, the algorithm may have a parameter L such that the iteration terminates after L unsuccessful iterations, returning a negative result. This may be more efficient than running the iteration through all possible test substreams Tn. In one embodiment, a typical value for L is between 100 and 200. Another alternative is to not terminate the iteration after a successful match, but rather let it run to the full L iterations. This would be useful in finding additional substreams close to T, although extra care should be taken to limit duplicate returns from different iterations.

In one embodiment, if a hash table is used for checking multiple substream references, the efficiency of the algorithm is improved by retaining the hash table from one step of the iteration to the next, adjusting the offset elements of the substream references. In addition, any substream reference in a candidate set whose corresponding test substream was not in fact a close match may be removed from the hash table.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

I claim:

1. A computer-implemented method for identifying a test stream by matching the test stream to a substream within a repository of standard streams,
wherein the test stream is obtained from a series of samples of an event or a content item, and a substream comprising at least a portion of a standard stream in the repository, the method comprising:
indexing a plurality of substreams according to a plurality of templates,
each template specifying a number of bit positions, wherein a given template is associated with a plurality of buckets,
each bucket referencing a group of substreams that have the same values at the bit positions specified by the template;
for a plurality of buckets, marking the buckets, for which the bits in the test stream match the bits in the substreams of the Bucket at the bit positions specified by the template associated with the bucket;
identifying a candidate set of substreams based on the occurrence in the marked buckets of each substream;
testing the substreams of the candidate set to determine whether one or more of the substreams thatch the test stream within an error tolerance; and
presenting a result of the testing.

2. The method of claim 1, wherein testing each of the substreams comprises:
determining a distance between the test stream and the substream; and
identifying the substream as a match if the distance is within the error tolerance.

3. The method of claim 2, wherein the distance is computed based on a fraction of the corresponding bits in the test stream and the substream that are not the same, the error tolerance defined as a predetermined fraction of bits that are allowed to be different between the test stream and a matching substream.

4. The method of claim 1, wherein each bucket references one or more substreams using an identifier of a standard stream in the repository and an offset within that standard stream for locating the substream within the standard stream.

5. The method of claim 1, wherein each standard stream comprises a plurality of frames, each frame containing characteristic information related to a sample of an audio item.

6. The method of claim 1, wherein the test stream comprises a plurality of frames, each frame having a number of bits describing characteristic information about a sampled audio item.

7. A computer-implemented method for identifying a test sequence by matching the test sequence to a substream within a repository of standard streams, wherein the test sequence is obtained from a series of samples of an event or a content item, a substream comprising at least a portion of a standard stream in the repository, the method comprising:
indexing a plurality of substreams according to a plurality of templates, each template specifying a number of bit positions, wherein a given template is associated with a plurality of buckets, each bucket referencing a group of substreams that have the same values at the bit positions specified by the template;
selecting a first subsequence of the test sequence, wherein the first subsequence has a length equal to a test length and the test sequence has a length greater than the test length;
searching the repository for the first subsequence by:
for a plurality of buckets marking the buckets for which the bits in the first subsequence match the bits in the substreams of the bucket at the bit positions specified by the template associated with the bucket,
identifying a candidate set of substreams based on the occurrence in the marked buckets of each substream, and
testing the sub streams of the candidate set to determine whether one or more of the substreams match the first subsequence within an error tolerance;
for any substreams that match the first subsequence within the error tolerance,
determining whether the test sequence matches a corresponding substream of the repository;
if the test sequence does not match any substreams in the repository,
selecting a second subsequence of the test sequence having a length equal to the test length;
searching the repository for the second subsequence by:
for a plurality of buckets, marking the buckets for which the bits in the second subsequence match the bits in the substreams of the bucket at the bit positions specified by the template associated with the bucket;
identifying a candidate set of substreams based on the occurrence in the marked buckets of each substream, and
testing the substreams of the candidate set to determine whether one or more of the substreams match the second subsequence within an error tolerance;
for any substreams that math the second subsequence within the error tolerance,
determining whether the test sequence matches a corresponding substream of the repository; and
presenting a result of the testing.

8. A computer-implemented method for fuzzy matching a test stream to one or more standard streams in a repository,
wherein the test stream is obtained from a series of samples of an event or a content item, the test stream suspected of matching one or more substream portions of one or more standard streams in the repository within a given error tolerance, the method comprising:
searching a plurality of indexes for substreams in the repository,
each index including a template that defines a plurality of bit positions within a substream,
a set of buckets for which each bucket identifies a group of substreams that have the same bit values at the bit positions defined by the template, and
a set of keys for which each key is associated with a bucket and identifies the shared bit values at the bit positions defined by the template for the substream references referenced by the associated bucket,
wherein for each of a plurality of indexes the searching comprises:
computing an index value of the test stream, the index value comprising a bit string for which each bit in the bit stream is equal to the value of the bit in the test stream at a bit position specified by a template associate with the index, and
if a key in the index matches the index, value of the test stream, marking the bucket associated with the key;

identifying a candidate set of substreams based on the occurrence of each the substreams in marked buckets;

testing each of the substreams in the candidate set for a match with the test stream within the given error tolerance; and presenting a result of the testing.

9. The method of claim 8, wherein testing each of the substreams comprises:

determining a distance between the test stream and the substream; and identifying the substream as a match if the distance is within the error tolerance.

10. The method of claim 9, wherein the distance is computed based on a fraction of the corresponding bits in the test stream and the substream that are not the same, the error tolerance defined as a predetermined fraction of bits that are allowed to be different between the test stream and a matching substream.

11. The method of claim 8, wherein each standard stream comprises a plurality of frames, each frame containing characteristic information related to a sample of an audio item.

12. The method of claim 8, wherein the test stream comprises a plurality of frames, each frame having a number of bits describing characteristic information about a sampled audio item.

13. A computer program product for identifying a test stream by matching the test stream to a substream within a repository of standard streams, wherein the test stream is obtained from a series of samples of an event or a content item, a substream comprising at least a portion of a standard stream in the repository, the computer program product comprising a computer-readable storage medium containing computer program code for performing the operations:

indexing a plurality of substreams according to a plurality of templates, each template specifying a number of bit positions, wherein a given template is associated with a plurality of buckets, each bucket referencing a group of substreams that have the same values at the bit positions specified by the template;

for a plurality of buckets; marking the buckets for which the bits in the test stream match the bits in the substreams of the bucket at the bit positions specified by associated the template associated with the bucket;

identifying a candidate set of substreams based on the occurrence in the marked buckets of each substream; and testing the substreams of the candidate set to determine whether one or more of the substreams match the test stream within an error tolerance; and presenting a result of the testing.

14. The computer program product of claim 13, wherein testing each of the substreams comprises:

determining a distance between the test stream and the substream; and identifying the substream as a match if the distance is within the error tolerance.

15. The computer program product of claim 14, wherein the distance is computed based on a fraction of the corresponding bits in the test stream and the substream that are not the same, the error tolerance defined as a predetermined fraction of bits that are allowed to be different between the test stream and a matching substream.

16. The computer program product of claim 13, wherein each bucket references one or more substreams using an identifier of a standard stream in the repository and an offset within that standard stream for locating the substream within the standard stream.

17. The computer program product of claim 13, wherein each standard stream comprises a plurality of frames, each frame containing characteristic information related to a sample of an audio item.

18. The computer program product of claim 13, wherein the test stream comprises a plurality of frames, each frame having a number of bits describing characteristic information about a sampled audio item.

19. A computer program product for fuzzy matching a test stream to one or more standard streams in a repository, wherein the test stream is obtained from a series of samples of an event or a content item, the test stream suspected of matching one or more substream portions of one &more standard streams in the repository within a given error tolerance, the'computer program product comprising a computer-readable storage medium containing computer program code for performing the operations:

searching a plurality of indexes for substreams in the repository, each index including a template that defines a plurality of bit positions within a substream, a set of buckets for which each bucket identifies a group of substreams that have the same bit values at the bit positions defined by the template, and a set of keys for which each key is associated with a bucket and identifies the shared bit values at the bit positions defined by the template for the substream references referenced by the associated bucket, wherein for each of a plurality of indexes the searching comprises:

computing an index value of the test stream, the index value comprising a bit string for which each bit in the bit stream is equal to the value of the bit in the test stream at a bit position specified by a template associate with the index, and if a key in the index matches the index value .of the test stream, marking the bucket associated with the key;

identifying a candidate set of substreams based on the occurrence of each the substreams in marked buckets;

testing each of the substreams in the candidate set for a match with the test stream within the given error tolerance; and presenting a result of the testing.

20. The computer program product of claim 19, wherein testing each of the substreams comprises:

determining a distance between the test stream and the substream; and identifying the substream as a match if the distance is within the error tolerance.

21. The computer program product of claim 20, wherein the distance is computed based on a fraction of the corresponding bits in the test stream and the substream that are not the same, the error tolerance defined as a predetermined fraction of bits that are allowed to be different between the test stream and a matching substream.

22. The computer program product of claim 19, wherein each standard stream comprises a plurality of frames, each frame containing characteristic information related to a sample of an audio item.

23. The computer program product of claim 19, wherein the test stream comprises a plurality of frames, each frame having a number of bits describing characteristic information about a sampled audio item.

24. A computer-implemented method for matching a test segment to one or more data items in a database, wherein the test segment is obtained from a series of samples of an event or a content item, the method comprising:
- indexing a plurality of data segments by a plurality of templates,
  - each data segment comparable to a test segment and comprising a contiguous portion of a data item in the database, and
  - each template specifying a different set of locations within a segment;
- for each of a plurality of templates, identifying any indexed data segments that match the test segment at the set of locations specified by the template;
- identifying a candidate set of data segments based on the number of occurrences the data segments matched the test segment for each of a number of templates;
- testing the data segments in the candidate set to determine whether one or more data segments match the test segment within an error tolerance; and
- presenting a result of the testing.

25. The method of claim 24, wherein each template specifies a plurality of bit positions in a segment.

26. The method of claim 24, wherein testing each of the data segments comprises:
- determining a distance between the test segment and the data segment; and
- identifying the data segment as a match if the distance is within the error tolerance.

27. The method of claim 24, wherein each data item comprises a plurality of frames, each frame containing characteristic information about sampled media content.

28. The method of claim 24, wherein the test segment comprises a plurality of frames, each frame having a number of bits describing characteristic information about sampled media content.

* * * * *